United States Patent [19]

Sato

[11] Patent Number: 5,021,814

[45] Date of Patent: Jun. 4, 1991

[54] SINGLE-LENS REFLEX CAMERA WITH STROBE INCORPORATED THEREIN

[75] Inventor: Masao Sato, Fujimi, Japan

[73] Assignee: Asahi Kogaku Kogyo Kabushiki Kaisha, Tokyo, Japan

[21] Appl. No.: 383,442

[22] Filed: Jul. 24, 1989

[30] Foreign Application Priority Data

Jul. 29, 1988 [JP] Japan .................. 63-100693[U]

[51] Int. Cl.⁵ .......................................... G03B 15/03
[52] U.S. Cl. .............................. 354/149.11; 354/288
[58] Field of Search ................. 354/126, 129, 145.1, 354/149.11, 149.1, 288

[56] References Cited

U.S. PATENT DOCUMENTS

| | | | |
|---|---|---|---|
| 4,500,184 | 2/1985 | Morizumi et al. | 354/149.11 |
| 4,525,046 | 6/1985 | Takaoka et al. | 354/149.11 |
| 4,597,656 | 7/1986 | Yamashita | 354/149.11 |

FOREIGN PATENT DOCUMENTS

| | | | |
|---|---|---|---|
| 275089 | 7/1988 | European Pat. Off. | 354/149.11 |
| 2086594 | 5/1982 | United Kingdom . | |
| 2106261 | 4/1983 | United Kingdom . | |
| 2118728 | 11/1983 | United Kingdom . | |

*Primary Examiner*—Brian W. Brown
*Attorney, Agent, or Firm*—Sandler, Greenblum & Bernstein

[57] ABSTRACT

A single-lens reflex camera having a strobe light emitter incorporated therein and located above a pentagonal prism on the camera body is disclosed. The camera body is provided on its upper portion with mounting seats for the strobe light emitter. The strobe light emitter is provided with securing legs which can be secured to the corresponding mounting seats of the camera body.

17 Claims, 2 Drawing Sheets

SINGLE-LENS REFLEX CAMERA WITH STROBE INCORPORATED THEREIN

BACKGROUND OF THE INVENTION

1. Field of the Invention

The present invention relates to a single-lens relfex camera having a strobe incorporated therein and more precisely it relates to a supporting mechanism of a light emitting portion of the strobe thereof.

2. Description of Related Art

A single-lens reflex camera having a strobe incorporated therein usually has a strobe light emitter provided on a pentagonal prism. There are two known types of strobe emitters, one of which is a pop-up type in which the light emitter moves between a retracted position and a projected position, and the other being a stationary type in which the light emitter is immovable.

In the known single-lens reflex camera as mentioned above, the strobe emitter is supported on an upper decorative plate which is secured to a camera body and which is made separate from the camera body.

FIG. 2 shows a known single-lens reflex camera, in which the upper decorative plate 11 has a mounting seat 13 on which the strobe emitter 12 is mounted through a mounting flange 14. The upper decorative plate 11 to which the strobe emitter 12 is mounted is secured to the camera body (body portion) 16 which has a front plate 15 secured thereto. Numeral 17 designates the pentagonal prism above which the strobe emitter 12 is located.

In this arrangement, the strobe emitter 12 is secured to the upper decorative plate 11 which is then secured to the camera body 16, resulting in a decreased positional precision of the strobe emitter with respect to the camera body 16. To this end, the strobe illumination angle and the alignment of the optical axis of a light emitting surface 12a of the strobe emitter 12 with respect to the len's optical axis of the front plate 15 must be adjusted after the upper decorative plate 11 is secured to the camera body 16. Furthermore, when an auxiliary projector 12b is provided on the strobe emitter 12, the similar adjustment must be effected for the auxiliary projector 12b. Since the upper decorative plate 11 is made of a relatively thin plate, strength to support the strobe emitter 12 may be insufficient. Furthermore, the strobe circuit is usually provided on the camera body 16 because it is large, and is connected by solder to conducting wires (lead lines) extending from the strobe emitter 12. The soldering operation is however, complicated and troublesome. Also, there is a possibility that the lead lines become jammed between the upper decorative plate 11 and the camera body 16.

SUMMARY OF THE INVENTION

The primary object of the present invention is to provide a single-lens reflex camera in which the strobe emitter having a sufficient supporting strength can be easily and precisely positioned in place and in which the treatment of the leading lines is simplified.

To achieve the object mentioned above, according to the present invention, there is provided a single-lens reflex camera having therein a strobe which has a light emitting portion located above a pentagonal prism secured to a camera body, wherein the camera body is provided on its upper portion with mounting seats, and the light emitting portion of the strobe has a plurality of securing legs which can be secured to the mounting seats of the camera body.

A camera body of a single-lens reflex camera is usually made of an aluminum die-casting and accordingly has a sufficient strength and a high manufacturing precision. Accordingly, the attachment of the strobe emitter (light emitting portion) directly to the camera body can realize a strong and precise supporting mechanism.

The camera body usually has a front plate having a lens mount to which a lens can be detachably mounted. The front plate is secured to the camera body. The camera body and the front plate define reference surfaces of all elements of the camera. In particular, the lens mount determines the optical axis of the photographing lens, and accordingly the mounting seats provided on the camera body including the front plate contribute to a precise positional relationship thereof to the optical axis of the camera body. Therefore, the strobe emitter which is secured to the mounting seats of the camera body through the securing legs of the strobe emitter can be easily and precisely positioned with respect to the optical axis of the photographing lens. Furthermore, since the strobe emitter is secured to the camera body including the front plate before the upper decorative plate is secured thereto, the treatment of the lead lines can be simplified.

BRIEF DESCRIPTION OF THE DRAWINGS

The invention will be described below in detail with reference to the accompanying drawings, in which.

DESCRIPTION OF PREFERRED EMBODIMENT

Figure 1:
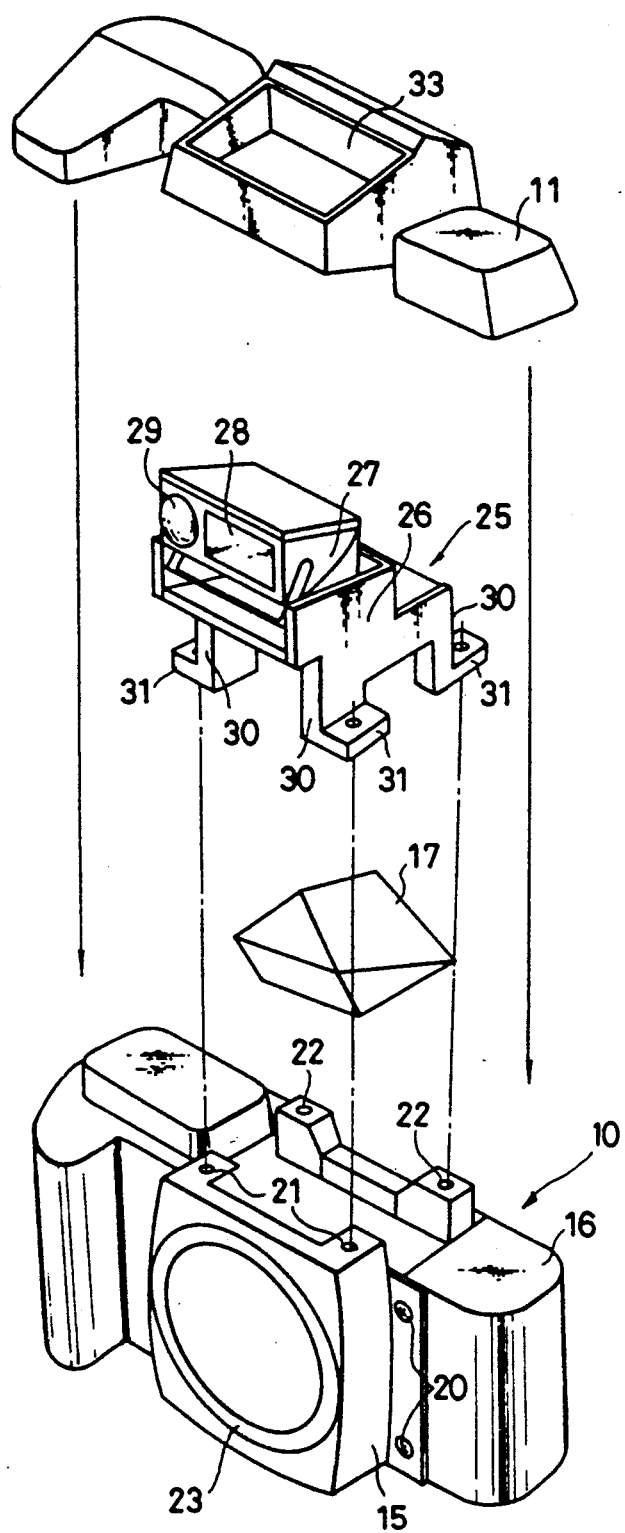
FIG. 1 is an exploded perspective view of a single-lens reflex camera having a strobe incorporated therein, according to the present invention; and, FIG. 2 is a view similar to FIG. 1, but according to a prior art.

In FIG. 1, the camera body 10 has a body portion 16 and a front plate 15 which is rigidly connected to the a body portion 16 by set screws 20. Both the body portion 16 and the front plate 15 are provided on their upper portions with pairs of mounting seats 21, 22, respectively. The mounting seats 21 and 22 are very precisely positioned with respect to the lens mount 23 (and other reference surfaces) provided on the front plate 15. The precise positioning of the mounting seats 21 and 22 can be easily effected, since the front plate 15 and the body portion 16 are reference elements of the single-lens reflex camera. The mounting seats 21 and 22 are located to correspond to four corners of the pentagonal prism 17 located on the camera body 10.

The strobe light emitting portion (strobe light emitter) 25 has a stationary casing 26 and a movable strobe casing 27 which is supported by the stationary casing 26 so as to retractably project therefrom. The strobe casing 27 has therein a strobe flasher (emitter) 28 and an auxiliary projector 29. The strobe casing 27 is located in a projected position in FIG. 1. The auxiliary projector 29 projects a contrast pattern for an automatic focusing on an object to be photographed when the object has a small contrast or low brightness.

The stationary casing 26 of the strobe light emitter 25 has a plurality of securing legs (four legs in the illustrated embodiment) 30 integral therewith, which can be rigidly connected to the associated mounting seats 21 and 22. The optical axis of the strobe flasher 28 and the auxiliary projector 29 are properly adjusted with respect to mounting seats 31 provided on the securing legs 30 when the strobe casing 27 is projected from the stationary casing 26. The securing legs 30 and the mounting seats 31 and the mounting surfaces (lower surfaces) thereof are precisely formed so as to meet the positional precision of the mounting seats 21 and 22 and the surface precision of the mounting surfaces thereof.

The mounting seats 31 of the securing legs 30 of the strobe light emitter 25 are secured to the corresponding mounting seats 21 and 22 of the front plate 15 and the body portion 16, respectively. Since the mounting seats 21 and 22 are provied on the front plate 15 and the body portion 16, both defining reference surfaces for all of the elements of the camera, and since the securing legs 30 are precisely mounted to the associated mounting seats 21 and 22, the optical axes of the strobe flasher 28 and the auxiliary projector 29 supported by the strobe emitter 25 integral with the securing legs 30 can be precisely positioned with respect to the optical axis of the lens mount 23 and accordingly of the photographing lens. Furthermore, if the adjustment of the optical axes of the strobe flasher 28 and the auxiliary projector 29 is effected after the strobe emitter 25 is mounted to the mounting seats 21 and 22, the precision of the adjustment can be increased.

Figure 2:
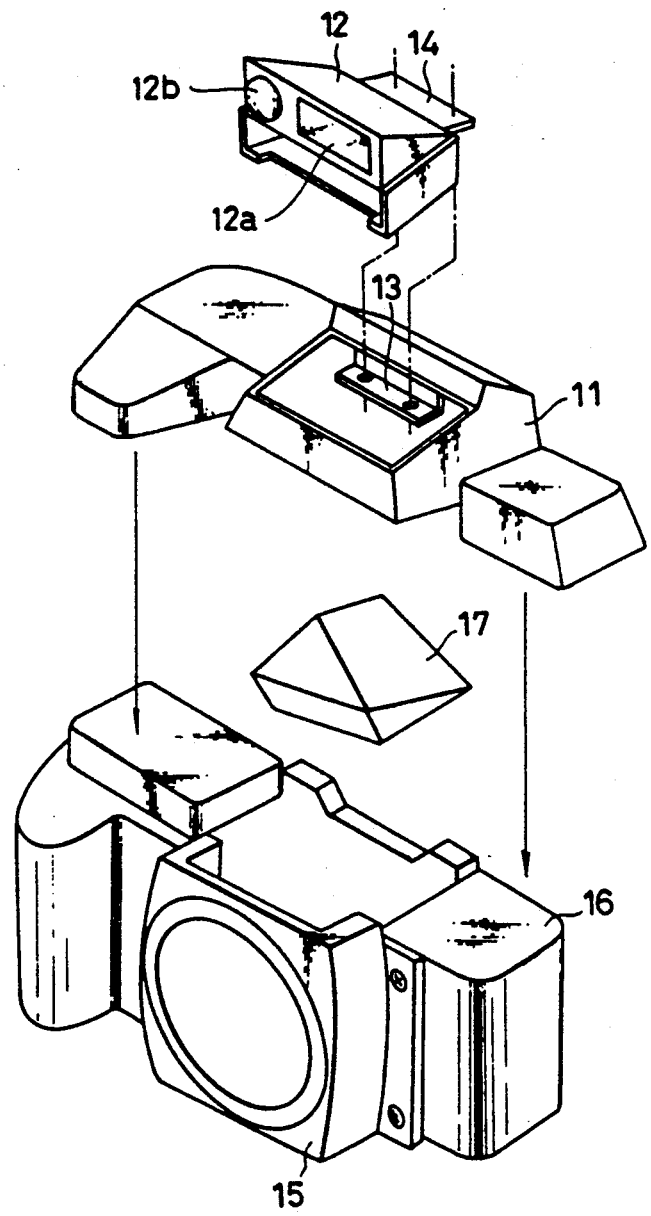

The upper decorative plate 11 is secured to the body portion 16 after the strobe light emitter 25 is secured to the mounting seats 21 and 22. Since the solder connection of the lead lines (not shown) extending from the body portion 16 to the strobe circuit (not shown) of the body portion 16 is effected before the upper decorative plate 11 is secured, the soldering operation can be simplified and there is no possibility that the lead lines are jammed between the upper decorative plate 11 and the body portion 16. Note that no mounting seat 13 (FIG. 2) is provided on the upper decorative plate 11. Instead thereof, an opening 33 through which the strobe light emitter 25 is inserted is formed on the upper decorative plate 11.

The illustrated embodiment mentioned above is directed to a pop-up type in which the strobe flasher 28 and the auxiliary projector 29 are moved between the retracted position and the projected position. The present invention can be also applied to a stationary type strobe in which the strobe flasher (and the auxiliary projector) are immovable.

As can be understood from the foregoing, according to the present invention since the mounting seats are provided on the camera body including the front plate having the lens mount which determines the optical axis of the photographing lens, and since the corresponding legs are provided on the strobe light emitter to be secured to the associated mounting seats, the strobe light can be easily and precisely positioned with respect to the optical axis of the strobe light emitter. Furthermore, the supporting strength can be increased.

In addition, since the positional adjustment can be effected before the upper decorative plate is secured to the camera body, the connecting operation of the lead wires of the strobe light emitter to the strobe circuit can be simplified.

I claim:

1. A single lens reflex camera having a strobe light emitter incorporated therein, said camera comprising a camera body frame having an upper portion and an upper decorative plate attached to said camera body frame, wherein said camera body frame includes, on said upper portion, mounting seats to which said strobe emitter is mounted, said strobe emitter including securing legs positioned to be secured to said corresponding mounting seats of said camera body frame.

2. A single lens reflex camera according to claim 1, wherein said camera body frame includes a body portion having a front portion, said camera body frame further includes a front plate which is secured to said front portion of said body portion, and wherein said front plate includes a lens mount.

3. A single lens reflex camera according to claim 2, wherein said mounting seats are on said body portion and on said front plate.

4. A single lens reflex camera according to claim 3, wherein said body portion is made of aluminum die-casting.

5. A single lens reflex camera according to claim 3, wherein said front plate is made of aluminum die-casting.

6. A single lens reflex camera according to claim 1, wherein said strobe light emitter includes means mounting said emitter for movement between a retracted position in which said strobe light emitter is retracted into said camera and a projected position in which said strobe light emitter is projected from said camera.

7. A single lens reflex camera according to claim 6, wherein said strobe light emitter comprises a stationary casing secured to said mounting seats of said camera body frame and a movable strobe casing movably supported in said stationary casing so as to retract into and project from said stationary casing.

8. A single lens reflex camera according to claim 7, wherein said securing legs are provided on said stationary casing.

9. A single lens reflex camera according to claim 7, wherein said camera body frame includes an upper portion and said an upper decorative plate is attached to said camera body frame on said upper portion.

10. A single lens reflex camera according to claim 9, wherein said upper decorative plate includes an opening, and wherein said strobe light emitter is positioned in said opening.

11. A single lens reflex camera according to claim 8, wherein said strobe light emitter comprises a strobe flasher and an auxiliary projector, said auxiliary projector comprising means for projecting a contrast pattern onto an object to be photographed.

12. A single lens reflex camera according to claim 11, wherein said strobe flasher and said auxiliary projector are mounted to said movable strobe casing.

13. A single lens reflex camera having a strobe light emitter incorporated therein, said camera comprising a camera body and a pentagonal prism, said pentagonal prism having four corners, said emitter located above said pentagonal prism on said camera body, wherein said camera body including four mounting seats to which said strobe light emitter is mounted, said seats positioned to correspond to the four corners of said pentagonal prism, whereby said strobe light emitter is secured to said mounting seats of said camera body.

14. A single lens reflex camera according to claim 13, wherein said camera body includes a body portion, said body portion includes a front portion, and a front plate is secured to said front portion of said body portion, said front plate includes a camera mount, and wherein two of said mounting seats positioned to correspond to the corners of said pentagonal prism are provided on said body portion and two of said mounting seats are provided on said front plate.

15. A single lens reflex camera according to claim 14, wherein said camera body includes an upper portion and further comprising an upper decorative plate attached to said camera body on said upper portion.

16. A single lens reflex camera according to claim 15, wherein said upper decorative plate includes an opening, and wherein said strobe light emitter is positioned in said opening.

17. A single lens reflex camera having a camera body frame, a strobe light emitter and an upper decorative plate secured to said camera body frame, said camera body frame including an upper portion, said upper portion of said camera body frame including a mounting portion, said strobe light emitter mounted to said mounting portion of said camera body frame, said strobe light emitter including a securing portion secured to said mounting portion of said camera body frame, said upper decorative plate including an opening, wherein said strobe light emitter is positioned within said opening.

* * * * *